Aug. 24, 1948.                L. DEVAUX                 2,447,497
              BLOCK ENTRANCE INITIATED TRAIN SIGNALING SYSTEM
Filed March 10, 1943                              2 Sheets-Sheet 1

INVENTOR.
LUCIEN DEVAUX
BY
Edward D. Phinney
ATTORNEY

INVENTOR.
LUCIEN DEVAUX

Patented Aug. 24, 1948

2,447,497

UNITED STATES PATENT OFFICE 2,447,497

BLOCK ENTRANCE INITIATED TRAIN SIGNALING SYSTEM

Lucien Devaux, Lyon, France, assignor to International Standard Electric Corporation, New York, N. Y., a corporation of Delaware Application March 10, 1943, Serial No. 478,696
In France May 29, 1941

Section 1, Public Law 690, August 8, 1946
Patent expires May 29, 1961

19 Claims. (Cl. 246—62)

The invention herein disclosed constitutes an improvement for train controlled signaling systems using apparatus for repeating signals in the engine cab to indicate the condition of the succeeding blocks or track sections wherein means is provided for insuring a "busy track" signal when because of the condition of the ramp no signal would ordinarily be given.

The detailed objects of this invention and the systems by which they are accomplished will be apparent from the following detailed description of the embodiment shown in the attached drawings.

This invention resides substantially in the combination, construction, arrangment and relative location of parts, as will be described in detail below.

Figure 1:
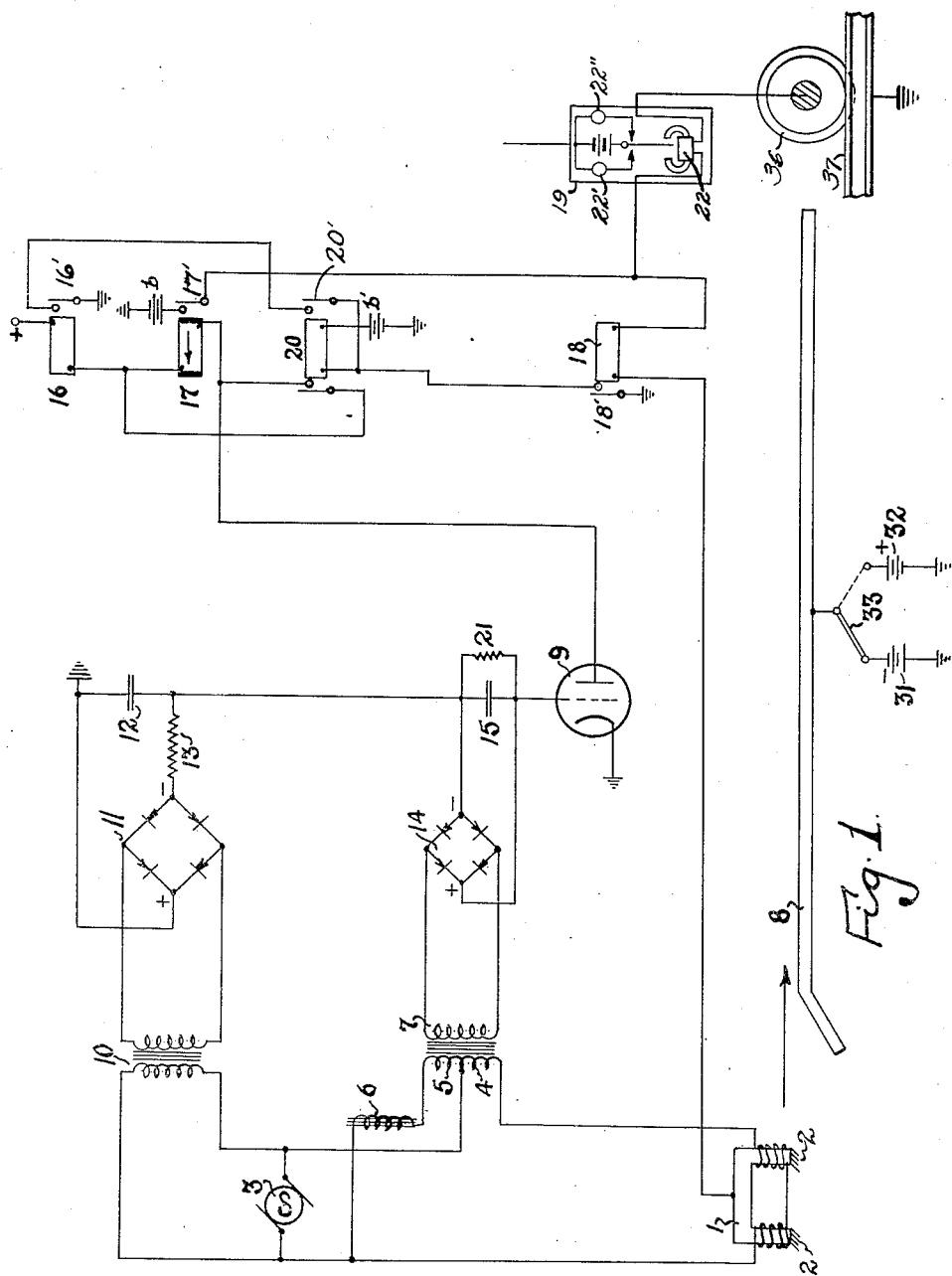
Figure 2:
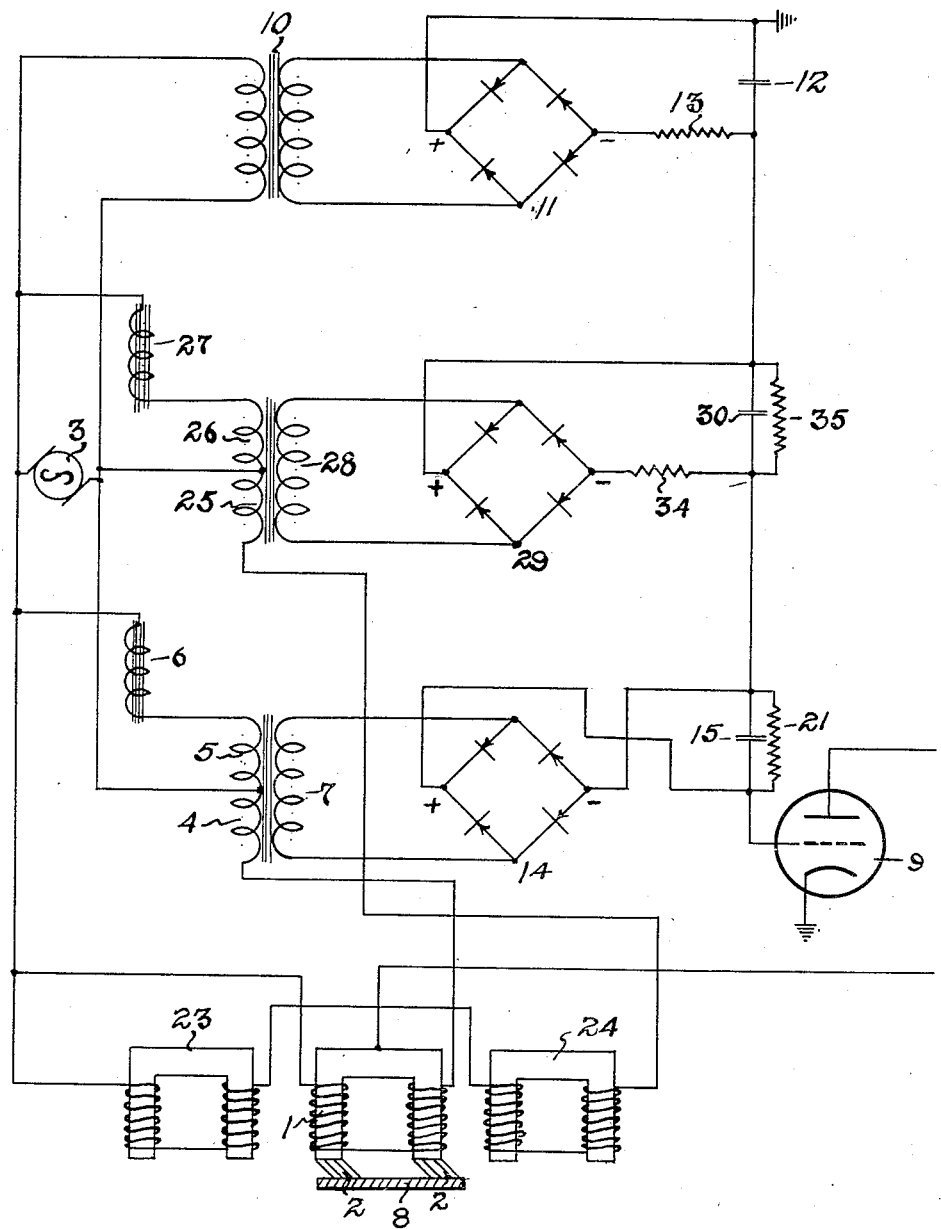

In the accompanying drawings,

Figure 1 is a diagrammatic and schematic layout of the signaling system in accordance with this invention for giving signals in the engine cab to indicate the condition of the succeeding track sections of blocks; and Figure 2 is a similar view disclosing a modification for the purpose of preventing repetition of signals in the engine cab when it passes over a substantial iron mass such as a metal bridge.

There are in use today track signaling systems which employ a contact of some sort frequently called contact-making ramps arranged along the railway tracks between the rails and brought to electric potentials of opposite polarities in accordance with the condition of the track section or block into which the train is to pass, viz., whether it is free or busy. In systems of this type the locomotive or engine carries a wiper arranged to wipe along or come in contact with the contact making ramp at the time it passes over the ramp and depending upon the polarity thereof there is transmitted to the cab of the locomotive a signal in some suitable form which indicates whether the advance block is free or busy. A difficulty which is encountered in the operation of this system in that it is dependent upon a good contact between the wiper and the ramp. If for any cause whatsoever such as for example a glazed frosted surface on the ramp good contact between it and the wiper is not made, no signal is repeated or given in the engineer's cab, with the result that he is not apprised of the condition of the succeeding block.

In accordance with this invention there is provided a complementary system for giving a signal in the engineer's cab of a nature and characteristics which overcome this difficulty. In accordance with the principles of this invention mechanism is provided and associated with the normal signaling arrangement to insure the operation of the alarm signal in the engine cab to indicate "busy track," regardless of whether the succeeding block is busy or not, in the event that the regular contact-making elements do not properly cooperate, regardless of the reason. As a result of the use of this invention should "busy track" condition be indicated, even though the track is clear, the engineer may bring the train to a stop, which is less objectionable than undergoing the risk of running into a busy track section.

In accordance with this invention the wiper contact is modified from that usually employed so as to include an electro-magnet having two arms or branches, each of which is provided with the usual wipers frequently in the form of metal clips or wire feelers that normally engage the contact-making ramp. This electro-magnet is included in suitable control circuits so that when the electro-magnet is remote from the ramp its inductance is at a minimum and the connected circuit is balanced. When it passes over a contact-making ramp, which in this case, of course, must be of iron or steel, the inductance of the electro-magnet increases. The magnet, of course, is so positioned that it will pass in close proximity to the iron contact-making ramp, so that the reluctance of the electric circuit and the electro-magnet is diminished, and its self-induction increased to unbalance the circuit to which it is connected. These inductance variations are utilized to cause the warning device to operate in the engine cab, but only when no direct contact is made between the wipers on the electro-magnet and the contact-making ramp.

As will be disclosed hereinafter, in more detail, cooperating timed control devices are employed so that when actual contact is made the auxiliary mechanism of this invention does not produce a signal in the cab, while on the other hand when no contact is made it does produce such a signal.

Thus each time that the electro-magnet passes over a ramp and the wipers do not contact the engineer receives a "busy track" signal regardless of whether the track is clear or not, and in accordance with the dictates of safety principles, he is warned to bring his train to a stop until true condition of the track is ascertained. Further, in accordance with this invention the signal given by the auxiliary mechanism may be made to distinguish from that normally given by the mechanism controlled by the contact wiper so that the engineer will know that the "busy track" signal is not the signal normally given by the wiper mechanism when the track is actually busy. This signal may be made to differ in many ways, not shown as for example making it of longer duration or of separated pulses of a desired characteristic to clearly distinguish it from normal "busy track" signals.

Upon consideration it will be seen that with the mechanism of this type untimely and undesired operation of the locomotive recorder or signal could result when the train passes over a substantial iron structure, such as for example a metal bridge. Therefore, in accordance with this invention this possibility is avoided by providing compensating mechanism sensitive to the length or importance, that is the mass of the metal structure over which the train passes, so that the mechanism is only operated by passing a contact-making ramp. As will be explained later, this compensating device may include two additional electro-magnets arranged on opposite sides of the main electro-magnet previously described to prevent the operation of the warning signal.

The embodiments of the invention set forth in the drawings will now be described in detail. In the system of Figure 1 the usual wiper mechanism, which includes the shoes, clips or wires 2 for engaging the contact-making ramp 8 mounted between the rails, is secured to the ends of the legs of a U-shaped electro-magnet 1. The legs of this magnet are provided with windings, as shown, which are connected in series through the primary 4 of a transformer to the terminals of a suitable alternating current generator 3. This generator may produce a current of suitable characteristics as for example one having a frequency of 200 cycles per second. An associated winding 5 of the transformer is connected across the generator 3 through the self-induction coil 6 whose inductance and resistance are selected so that when the wiper-electro-magnet combination 1 is in the air, that is remote from the ramp 8, the current flowing in the windings 4 and 5 will be in opposite directions and of the same strength and phase so as to be balanced. The result is that there will be no current flowing in the composite primary of the transformer of which the windings 4 and 5 are a part. The secondary 7 of the transformer is connected across the input terminals of a suitable rectifier bridge 14. This bridge may comprise dry rectifiers of the type for example such as selenium rectifiers which are connected to the bridge 14 which is of asymmetrical conductivity.

The ramp 8 is associated with a pair of grounded batteries or current sources 31, 32 alternatively connectible by means of a contact 33 to the ramp 8. When the contact 33 is connected to the battery 31 the ramp is at negative polarity and this may be assumed to indicate a "free track" condition. As will be understood by those skilled in the art, the position of the contact 33 is controlled by mechanism associated with the track section or block beyond the one with which the ramp is associated, so that it will be in the proper condition depending upon whether that block is busy or free.

The generator 3 is also connected to the primary of the transformer 10, the secondary of which is connected across the input terminals of the rectifier 11, which like the rectifier 14 is a bridge of elements of asymmetrical conductivity, which elements may be dry selenium rectifiers.

The output of the bridge 11 is connected across a capacitor 12 and a filtering resistance 13, the positive side of this circuit is grounded as shown. Similarly the output terminals of the rectifier bridge 14 are connected across a capacitor 15 and a resistor 21 in parallel. These resistor-capacitor combinations are connected in series to the grid of a vacuum tube 9 whose cathode is grounded as shown.

When a voltage is developed across the condenser 15 because of the unbalanced condition of the primaries 4 and 5, the condenser 15 is charged with such polarity as to overcome the bias on the grid of the tube 9. Since the resistor 21 is across the condenser 15, the condenser must discharge through the resistor 21 and hence will maintain its potential on the grid of the tube 9 after the unbalanced condition of primaries 4 and 5 has been removed.

The plate of the vacuum tube 9 is connected in series with the magnets 17 and 16 of relays each having a switch or movable contact 17' and 16' as a part thereof. The relays 16 and 17 have a timed relationship in that the relay 16 is quick acting upon energization, and the relay 17, as diagrammatically illustrated in the drawings, is slow acting upon energization. The movable contact 16' of relay 16 is grounded and the fixed contact is connected by a wire, as shown, to the fixed contact of a switch 20' forming part of the relay 20. The fixed contact of the relay 17 is grounded through a battery b or other current source, as shown, while the movable contact 17' is connected to the signal repeating mechanism in the engine or the locomotive of any known type shown diagrammatically at 19. This contact is also connected to one terminal of the magnet of the relay 18, the other terminal of which is connected to the core of the electro-magnet 1. The movable contact 20' at the right of relay 20 is connected to one terminal of the winding of this relay and to the fixed contact of the switch of relay 18. The movable contact 18' of the latter is grounded as shown. The other terminal of the winding of relay 20 is grounded through a suitable current source b', as shown. Relay 20 includes another switch, the fixed contact of which is shown connected to the anode of the vacuum tube 9. The movable contact 20" of this switch is connected to the common lead of the windings of relays 16 and 17.

The signal repeating mechanism 19 may operate by means of polarized relay 22 which controls lamps or buzzers 22' and 22" alternatively depending on the direction of current. The other side of the relay 22 is connected to ground through the wheels 36 of the train and track 37, as will be understood.

The operation of this system will now be described: When the locomotive passes over the ramp 8, the inductance of electro-magnet 1 increases independently of the speed of the locomotive. The result is that the currents in the primary 4—5 are unbalanced so that an alternating current is induced in the secondary 7 of this transformer and applied to the rectifier 14. At this point it may be noted that at all times the grid of the vacuum tube 9 is normally biased negatively so as to block the tube, with the result that no current flows in the plate circuit thereof. This biasing current is provided by the rectifier 11 and the output circuit including the capacitor 12 and resistor 13. The application of current to the input of the rectifier 14 causes the direct current voltage produced at its output to be applied through the resistor-capacitor combination 21—15 to the grid of the vacuum tube to adjust the grid voltage to such a value that the plate current can pass and this voltage is maintained until the condenser 15 discharges through the resistor 21. The result is that current flows in the plate circuit through the windings of relays 16 and 17 in series. Relay 16 immediately closes its switch, while the closing of the switch on relay 17 is delayed as previously explained. The time delay between the operation of these relays is adjusted and determined so that under normal operating conditions, including normal train speeds, the wipers 2 have a chance to pass over and off of the ramp 8 before the switch of relay 17 is closed. The absolute value of this time delay is of little importance, as will be seen later on. It should, however, be sufficiently large to give the normal signaling system time to operate, and thereby prevent the giving of a "busy track" signal during the period when contact between the wipers 2 and the ramp 8 is or is likely to be established to transmit the desired and correct signal to the device 19. This delay period should preferably be selected to give enough time to take into account the minimum likely speeds of the train. Those skilled in the art will understand that the duration of this delay can be varied in many different ways by using several relays in cascade or time delay circuits including resistor and capacitor combinations.

If the wiper contacts 2 have conductively engaged the ramp 8 a current flows from battery 31 or 32, depending upon the position of contact 33, directly through the core of the electro-magnet 1, and through the winding of the relay 18 to the apparatus 19 and back to ground in the usual and normal way, to indicate either a "busy track" or a "free track," depending upon the position of the contact 33. Of course, the winding 18 is also energized so that the switch of this relay closes, completing a circuit in an obvious manner to the winding of relay 20, whereupon both of the switches of this relay close. The closing of the right hand switch 20' provides a holding circuit for the winding of relay 20 through the switch 16' of relay 16 in an obvious manner to keep it energized until relay 16 is de-energized by the dissipation of energy from condenser 15 through resistance 21 and consequent rendering non-conductive of tube 9 which obviously will be after wipers 2 have left the ramp. At the same time the left hand switch 20" of relay 20 closes, short-circuiting the slow acting relay 17. This insures against further operation of the auxiliary equipment of this invention since it will be remembered a normal signal is being given to the apparatus 19.

However, in the event that direct contact is not made with the ramp and after the wipers 2 have left the ramp, that is after the time differential between relay 16 and 17, relay 17 will operate to close its switch. Under these conditions, of course, it will be recognized that relay 18 has not operated and hence relay 17 has not been short-circuited. The result of this is to connect the current source associated with switch 17' of relay 17 to the signaling apparatus 19 to operate it to give a "busy track" signal. It will be recalled that this results because the wipers 2 do not engage the ramp 8, and thus the engineer will bring the train to a stop as a safety measure until the true condition of the following track section or block can be ascertained. As previously mentioned the equipment within the signaling apparatus 19 can be so arranged that when it is energized and the battery connected to the switch of relay 17 a characteristic signal will be given over the ramp circuit different from both busy and clear signal. In order to avoid confusion in understanding this system it will be noted that under ordinary conditions as soon as the wipers 2 disengage the ramp 8, relay 18 will be de-energized so that its switch opens, breaking the pick up circuit to the winding of relay 20, so that its switch is opened to take the short circuit off of the winding of relay 17 as soon as relay 16 is deenergized. Thus the associated equipment of this invention will not operate since the signal has been directly given through the apparatus 19. On the other hand, when the wipers 2 do not contact the rail 8 for any reason, relay 18 is not operated, and although the switch of relay 16 closed, no pick up circuit for relay 20 is completed and the switches of relay 20 are not operated. It follows, therefore, that relay 17 is not short-circuited and can complete the auxiliary circuit to the signaling apparatus 19.

The signal given by relay 17 may be made distinguishable from the signal normally given by ramp 8 by providing relay 17 with a supplementary contact transmitting additional signals such as several pulses so that the resultant indication is wholly different from that produced by a contact between wipers 2 and ramp 8. The duration of this auxiliary signal may also be extended in time to indicate, for example, that the locomotive engineer has not been at fault in coming to a stop when the track is clear because he has obeyed the busy signal which has in truth really indicated a fault attributable to the condition of the ramp 8.

Upon consideration it will be seen that in the use of this system the presence of a substantial iron structure such as a metal bridge would be likely to cause improper operation of this system. In use the contact-making ramp would be placed at a certain height above the track rails, as for example 90 mm., and if the wipers are positioned say 20 mm. below the ramp, that is 70 mm. above the rails, the passing of a crossing or of a switch will produce no substantial effect on the system, especially in view of the short time taken in passing over the ramp, which is of a predetermined length, as for example, six meters. The control grid of the tube 9 may be biased so far from the operating point of the tube that weak discharges of the condenser 15 will not be sufficient to make the tube conductive. However, when the electro-magnet 1 passes over a relatively massive iron structure or one of considerable length, an improper warning signal could be given. For this reason the system of Figure 2 is provided.

The system of Figure 2 is basically the same as that of Figure 1, but in addition there is provided means to cancel the action of the system previously described when the train passes, for example, over a bridge. It includes the electromagnets 23 and 24 placed at each side of the electro-magnet 1 so that magnets 1, 23 and 24 are aligned transversely of the direction of movement of the train. The windings of electromagnets 23 and 24 are connected in series with the generator 3 and the portion 25 of the primary of an additional transformer. The other portion 26 of this transformer is connected to the generator 3 through the self-inductor 27. These circuit elements are so adjusted that normally no current flows in the composite primary 25—26, that is when electro-magnets 23 and 24 are not influenced by the presence of iron masses. When the electro-magnets 23 and 24 pass near an iron structure having a relatively large mass in comparison with the mass of ramp 8 their inductance increases and a current flows in the secondary winding 28. This current is rectified by the rectifier 29 which is similar to the other rectifiers previously described and is applied to condenser 30, shunted by the resistor 35 through the resistor 34 in such a direction as to render the control grid of tube 9 more negative with increasing current. Likewise, the inductance of electro-magnet 1 is increased and the current induced in the secondary winding 7 might be sufficient to cause the biasing of the grid of tube 9 such as to allow current to pass, but under the conditions assumed the variation in the inductance of electro-magnets 23 and 24 has raised the negative bias of the grid of tube 9 to offset the positive bias applied from the rectifier 14. These relative biasing values can be adjusted to cause the desired operating condition. There is, of course, no objection to rendering the control grid of tube 9 strongly negative because upon passing a contact-making ramp the action of the electro-magnets 23 and 24 is zero.

As those skilled in the art will appreciate the two transformers 10 and 25—26—28 can be joined into a single transformer, if desired, which would further simplify the arrangement of Figure 2.

The power required from the alternating current generator is of but a few watts, and this generator can easily be driven by a small motor supplied by the normal train lighting current. If desired, a transformer connected to a suitable rectifier may be used to supply plate current for the vacuum tube from the alternating current generator 3.

As those skilled in the art will readily appreciate, the subject matter of this invention is not limited to the embodiments given herein as example, but on the contrary is capable of numerous modifications and adaptations without departure therefrom. I do not, therefore, desire to be strictly limited to this disclosure, but rather by the appended claims.

What is claimed is:

1. A system for transmitting impulses to a locomotive signal device comprising a paramagnetic track contact, means for feeding current of predetermined polarity between said contact and the rails, a cooperative contact mounted on the locomotive, a source of alternating current carried by said locomotive, a first circuit connecting the locomotive contact with the signal device adapted to be energized on engagement of the locomotive and track contact, and obtaining circuit return via car wheels and rails, and second circuit means, including an electro-magnet mounted on the locomotive to pass close to the track contact, operative to actuate said signal device responsive to inductive influence of the track contact thereon and traversed by current from said alternating current source, and means responsive to said first circuit energizing to render said second and inductively energized circuit inoperative.

2. A system for transmitting impulses to a locomotive signal device comprising a paramagnetic track contact, means for feeding current of predetermined polarity between said contact and the rails, a cooperative contact mounted on the locomotive, a source of alternating current carried by said locomotive, a first circuit connecting the locomotive contact with the signal device, adapted to be closed on engagement of the locomotive and track contact, obtaining return circuit via car wheels and rails, and including a relay, auxiliary circuit means including an electro-magnet mounted on the locomotive to pass close to the track contact, operative to actuate said signal device responsive to inductive influence of the track contact thereon and traversed by current from said alternating current source, and means actuated by said relay and operative to render said auxiliary circuit means inoperative upon closing of the first circuit.

3. A system as defined in claim 2 wherein the auxiliary circuit means includes a slow acting relay operating to prevent the operation of the signal device by the auxiliary circuit means until the expiration of a predetermined period of time.

4. A system for transmitting impulses to a locomotive signal device comprising a paramagnetic track contact, means for feeding current of predetermined polarity between said contact and the rails, a cooperative contact mounted on the locomotive, a source of alternating current carried by said locomotive, a first circuit connecting the locomotive contact with the signal device adapted to be energized on engagement of the locomotive and track contact, and obtaining circuit return via car wheels and rails, auxiliary circuit means including an electro-magnet mounted on the locomotive to pass close to the track contact and operative to actuate said signal device responsive to inductive influence of the track contact thereon, and traversed by current from said alternating current source, said auxiliary circuit means including a vacuum tube and means normally to apply to the grid thereof a negative bias under condition of non-coupling of said magnet with the track contact and operative to apply a positive bias to the grid when said magnet is in coupling relation to the track contact, so as to permit it to pass current to operate the signal device, said auxiliary circuit means including a slow acting relay operative to prevent operation of the signal device until the expiration of a predetermined time interval and said first signal operating circuit means including a relay operating when energized to prevent the operation of said auxiliary signal circuit means.

5. A system for transmitting impulses to a locomotive signal device comprising a paramagnetic track contact, a cooperating contact mounted on the locomotive and consisting of a magnet core provided with shoes for contact engagement with said track contact, a source of alternating current carried by said locomotive, a circuit connecting the magnet core with said signal device, and obtaining circuit return via car wheels and rails, auxiliary circuit means including coils wound on said magnet core, means for energizing said coils and traversed by current from said alternating current source, a transformer having a first primary in series with said magnet coils and having an opposing primary connected in normally balanced relation to said first primary coil and a choke possessing inductance balancing that of said magnet coils connected in series with said opposing primary, a vacuum tube, a secondary for the transformer connected through a rectifier to the grid of said vacuum tube, a connection from the anode of said tube, a slow acting relay in series with said anode connection, a signal circuit controlled by the contact of said slow acting relay, a potential source of reversible polarity connected to said track contact and rails, a switch for reversing said polarity, a relay in series with said core circuit connection, and means operative to effect short circuiting of said slow acting relay upon the energizing of said relay.

6. A system for transmitting impulses to a locomotive signal device comprising a paramagnetic track contact, means for feeding current of predetermined polarity between said contact and the rails, a cooperative contact mounted on the locomotive, a source of alternating current carried by said locomotive, a first signal circuit connecting said locomotive contact with said signal device, adapted to be energized on engagement of said locomotive and said track contacts, and obtaining circuit return via car wheels and rails, a second signal circuit connected to energize said signal device and control circuit means for said second circuit including an electro-magnet mounted on said locomotive so as to pass close to said track contact and traversed by current from said alternating current source, and operative to effect closing of said second signal circuit responsive to inductive influence of said track contact on said magnet, and means responsive to energizing of said first circuit to effect opening of said second signal circuit.

7. A system for transmitting impulses to a locomotive signal device comprising a paramagnetic track contact, means for feeding current of predetermined polarity between said contact and the rails, a cooperating contact mounted on the locomotive, a source of alternating current carried by said locomotive, a first signal circuit connecting said locomotive contact with said signal device, adapted to be closed on engagement of said locomotive and said track contacts, and obtaining circuit return via car wheels and rails, and including a relay, auxiliary control circuit means including an electro-magnet mounted on said locomotive so as to pass close to said track contact and traversed by current from said alternating current source, a second signal circuit controlled by said auxiliary circuit means and operative to actuate said signal device responsive to inductive influence of said track contact on said magnet, and means actuated by said relay and operative to render said auxiliary circuit inoperative upon closing of said first circuit means.

8. A system for transmitting impulses to a locomotive signal device comprising a paramagnetic track contact, means for feeding current of predetermined polarity between said contact and the rails, a cooperative contact mounted on the locomotive, a source of alternating current carried by said locomotive, a first signal circuit connecting said locomotive contact with said signal device, adapted to be energized on engagement of said locomotive and said track contacts, and obtaining circuit return via car wheels and rails, auxiliary circuit means including electro-magnet means mounted on said locomotive to pass close to said track contact, traversed by current from said alternating current source, and operative to actuate said signal device responsive to inductive influence of the track contact thereon, said auxiliary circuit means including coils wound on the cores of said magnet positioned with one of the cores in the plane of said track contact, means operative to prevent operation of said auxiliary circuit means under inductive influence of magnetizable structure other than said track contact, said auxiliary circuit means including a first slow acting relay operative so as to prevent operation of said signal device until the expiration of a predetermined time interval and said first signal operating circuit means including a second relay and means actuated by said second relay to prevent the operation of said auxiliary signal circuit means.

9. A system for transmitting impulses to a locomotive signal device comprising a paramagnetic track contact, means for feeding current of predetermined polarity between said contact and the rails, a cooperative contact mounted on the locomotive, a source of alternating current carried by said locomotive, a first signal circuit connecting said locomotive contact with said signal device, adapted to be energized on engagement of said locomotive and said track contacts, and obtaining circuit return via car wheels and rails, an auxiliary control circuit including electromagnet means mounted on said locomotive so as to pass close to said track contact and traversed by current from said alternating current source, a second signal circuit controlled by said auxiliary circuit and operative to actuate said signal device, responsive to inductive influence of said track contact thereon, said auxiliary control circuit including coils wound on cores of said magnet positioned with one of the cores in the plane of said track contact and with cores at each side of said track contact positioned transversely of the direction of movement, means including said second mentioned cores operative to prevent operation of said auxiliary circuit under inductive influence of magnetizable structure other than said track contact, said auxiliary circuit including a first slow acting relay operative so as to prevent operation of said signal device until the expiration of a predetermined time interval and said first signal operating circuit including a second relay and means actuated by said second relay to maintain open said second, auxiliary circuit controlled, signal circuit.

10. The combination with a system for repeating track signals on a railroad vehicle including a signal device mounted on the vehicle and cooperative contacts mounted respectively on said vehicle and adjacent the track and an operating circuit connecting the vehicle contact with said signal device, of a ramp of relatively short length mounted adjacent the track, an element mounted on the vehicle so as to pass close to said ramp when said contacts are adapted to engage and arranged to have a different electric characteristic when in close proximity to said ramp, and circuit means associated with said element to respond to the change of said electric characteristic thereof, means associated with said last mentioned circuit means to operate said signal device in a predetermined manner when said last mentioned circuit means is operated, and means in said last mentioned circuit means and associated with said first mentioned circuit to render said circuit means inoperative when said first mentioned circuit is operated by said cooperating contacts.

11. The combination in accordance with claim 10, in which means is provided to delay the operation of the circuit means controlled by said element until after said element has passed said ramp.

12. The combination in accordance with claim 10, in which delay means is provided to prevent the operation of the circuit means controlled by said element for a certain time after the cooperating contacts have passed each other.

13. The combination in accordance with claim 10, in which a "busy track" signal is given by said signal device under control of said element circuit means when the first circuit under control of the cooperating contacts fails to operate.

14. The combination in accordance with claim 10, in which the operation of the circuit means under control of the element is delayed by means of a slow operating relay in the plate circuit of an electron discharge device whose control grid is maintained at an operating potential for a predetermined time by means of a charge on a condenser.

15. The combination in accordance with claim 10, in which the ramp and the contact adjacent the track are combined in one member.

16. The combination in accordance with claim 10, in which the element is an electromagnet.

17. A system for producing in a railroad vehicle signals received from the track which comprises a signal device carried by said vehicle, cooperating contacts mounted respectively on said vehicle and adjacent said track, circuit means operatively connecting the contact mounted on said vehicle and said signal device and with a source of current adjacent said track when said contacts are engaged, an electron discharge tube having a plate, a control grid, and a cathode, means normally to bias said grid so as to make said tube non-conducting, means independent of the electrical connection between said contacts for overcoming the bias on said grid so as to make said tube conductive when said contacts are passing each other, means to maintain said tube conducting for a certain time after said contacts have passed, a circuit connected to the plate and cathode of said tube, means under control of said circuit for delivering a predetermined signal to said signal device during the time said tube is conductive but after said contacts have passed, and means under control of said first mentioned circuit means for preventing the delivery of said last mentioned signal to said signal device except when said contacts fail to make electrical contact when passing.

18. A system according to claim 17, in which the means for overcoming the bias on the grid of the tube includes a mass adjacent the track contact and an element mounted on the vehicle and arranged to change its electrical characteristics when brought into proximity with said mass.

19. A system according to claim 17, in which the means for overcoming the bias on the grid of the tube includes a mass adjacent the track contact and an element mounted on the vehicle and arranged to change its electrical characteristics when brought into proximity with said mass, and in which additional means is provided to counteract the effect produced upon said element by masses at other locations than said first mentioned mass.

LUCIEN DEVAUX.

REFERENCES CITED

The following references are of record in the file of this patent:

UNITED STATES PATENTS

| Number | Name | Date |
| --- | --- | --- |
| 1,342,873 | Schweyer | June 8, 1920 |
| 1,460,449 | Simmen | July 3, 1923 |